United States Patent
Lee et al.

(10) Patent No.: US 9,384,386 B2
(45) Date of Patent: Jul. 5, 2016

(54) METHODS AND SYSTEMS FOR INCREASING FACIAL RECOGNITION WORKING RANG THROUGH ADAPTIVE SUPER-RESOLUTION

(71) Applicant: MOTOROLA SOLUTIONS, INC, Schaumburg, IL (US)

(72) Inventors: Kuan Heng Lee, Penang (MY); Kevin J O'Connell, Palatine, IL (US); Moh Lim Sim, Bayan Lepas (MY); Yan Zhang, Buffalo Grove, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 98 days.

(21) Appl. No.: 14/472,981

(22) Filed: Aug. 29, 2014

(65) Prior Publication Data
US 2016/0063316 A1    Mar. 3, 2016

(51) Int. Cl.
*G06K 9/00* (2006.01)

(52) U.S. Cl.
CPC .................................. *G06K 9/00295* (2013.01)

(58) Field of Classification Search
None
See application file for complete search history.

(56) References Cited

U.S. PATENT DOCUMENTS

| | | | |
|---|---|---|---|
| 7,218,796 B2 * | 5/2007 | Bishop | H04N 19/587 382/299 |
| 8,064,712 B2 | 11/2011 | Wheeler et al. | |
| 8,135,220 B2 | 3/2012 | Kim et al. | |
| 8,144,253 B2 * | 3/2012 | Su | G06T 5/002 348/575 |
| 8,625,860 B2 | 1/2014 | Kveton et al. | |
| 8,792,052 B2 * | 7/2014 | Koike | G06T 1/00 348/441 |
| 2007/0019887 A1 * | 1/2007 | Nestares | G06T 3/4053 382/299 |
| 2012/0300122 A1 | 11/2012 | Liu et al. | |
| 2012/0328197 A1 | 12/2012 | Sanderson et al. | |
| 2013/0202162 A1 | 8/2013 | Kim et al. | |
| 2014/0375878 A1 * | 12/2014 | Kataoka | H04N 21/43635 348/441 |
| 2015/0237264 A1 * | 8/2015 | Amitay | H04N 5/23296 348/240.2 |

FOREIGN PATENT DOCUMENTS

| | | | |
|---|---|---|---|
| CN | 103020937 A | | 4/2013 |
| CN | 102693419 B | | 2/2014 |
| EP | 225666 A3 | | 11/2011 |

(Continued)

OTHER PUBLICATIONS

Jia, et al. (Generalized Face Super-Resolution), IEEE, pp. 873-886, 2008.*

(Continued)

*Primary Examiner* — Daniel Mariam (57) ABSTRACT

Disclosed herein are methods and systems for increasing facial-recognition working range through adaptive super-resolution. One embodiment takes the form of a process that includes calculating one or more video metrics with respect to an input set of video frames. The process also includes obtaining a metric-specific weighting factor for each of the calculated video metrics. The process also includes calculating a weighted sum based on the obtained metric-specific weighting factors and the corresponding calculated video metrics. The process also includes selecting, based at least in part on the calculated weighted sum, a super-resolution technique from among a plurality of super-resolution techniques. The process also includes outputting an indication of the selected super-resolution technique.

18 Claims, 7 Drawing Sheets

(56) References Cited

FOREIGN PATENT DOCUMENTS

| | | | |
|---|---|---|---|
| WO | 02077908 | A1 | 10/2002 |
| WO | 2013192253 | A1 | 12/2013 |

OTHER PUBLICATIONS

Wheeler, et al. (Multi-Frame Super-Resolution for Face Recognition), IEEE, pp. 1-6, 2007.*

Hennings-Yeomans et al; Simultaneous Super-Resolution and Feature Extraction for Recognition of Low-Resolution Faces; Jun. 23-28, 2008; pp. 1-8 Website Address: http://research.microsoft.com/pubs/69499/simultaneous_cvpr_08.pdf.

Lin et al; super resolved faces for improved face recognition from surveillance video Website Address: http://link.springer.com/chapter/10.1007%2F978-3-540-74549-5_1; 2007.

* cited by examiner

METHODS AND SYSTEMS FOR INCREASING FACIAL RECOGNITION WORKING RANG THROUGH ADAPTIVE SUPER-RESOLUTION

BACKGROUND OF THE INVENTION

The process of facial recognition is one of the most widely used video-analysis and image-analysis techniques employed today. In the public-safety context, a vast amount of visual data is obtained on a regular and indeed often substantially continuous basis. Oftentimes one would wish to identify, e.g., a person of interest in these images and recordings. It could be the case that the quick and accurate identification of said person of interest is of paramount importance to the safety of the public, whether in an airport, a train station, a high-traffic outdoor space, or some other location. Among other benefits, facial recognition can enable public-safety responders to identify persons of interest promptly and correctly. It is often the case, however, that the quality of the images being input to—and analyzed by—facial-recognition software is correlated with the accuracy and immediacy of the results. Poor image quality may be due to one or more of low resolution, indirect view of a person's face, less-than-ideal lighting conditions, and the like.

To reduce the negative impact of poor image quality, various pre-facial-recognition tools can be utilized. One category of such tools is known as super-resolution. Various super-resolution techniques exist. Accordingly, for this reason and others, there is a need for methods and systems for increasing facial-recognition working range through adaptive super-resolution.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and systems for increasing facial-recognition working range through adaptive super-resolution. One embodiment takes the form of a process that includes calculating one or more video metrics with respect to an input set of video frames. The process also includes obtaining a metric-specific weighting factor for each of the calculated video metrics. The process also includes calculating a weighted sum based on the obtained metric-specific weighting factors and the corresponding calculated video metrics. The process also includes selecting, based at least in part on the calculated weighted sum, a super-resolution technique from among a plurality of super-resolution techniques. The process also includes outputting an indication of the selected super-resolution technique.

Another embodiment takes the form of a system that includes a communication interface, a processor, and data storage containing instructions executable by the processor for causing the system to carry out at least the functions described in the preceding paragraph.

Moreover, any of the variations and permutations described in the ensuing paragraphs and anywhere else in this disclosure can be implemented with respect to any embodiments, including with respect to any method embodiments and with respect to any system embodiments.

In at least one embodiment, the process further includes pre-selecting the input set of video frames from a larger set of video frames. In at least one such embodiment, the process further includes receiving the larger set of video frames from a face-detection system. In at least one other such embodiment, the process further includes receiving the larger set of video frames from a face-picture buffer. In at least one other such embodiment, the input set of video frames is a set of a first number of video frames, and pre-selecting the input set of video frames from the larger set of video frames includes calculating, for each video frame in the larger set of video frames, a pixelwise sum of absolute difference (SAD) of luminance values with respect to a reference frame in the larger set of video frames, and further includes selecting, for inclusion in the input set of video frames, the first number of video frames from the larger set of video frames having the lowest respective pixelwise SADs of luminance values with respect to the reference frame; in at least one such embodiment, the process further includes obtaining an interpupillary distance (IPD) of a face in one or more video frames in the larger set of video frames, and further includes selecting a particular frame in the larger set of video frames to be the reference frame based at least in part on the obtained IPD for the particular frame; in at least one such embodiment, the process further includes obtaining spatial-orientation data for the face in one or more video frames in the larger set of video frames, and further includes selecting the particular frame to be the reference frame based at least in part the obtained spatial-orientation data. In at least one embodiment, the process further includes selecting, based at least in part on one or more of the calculated video metrics, one or more configuration parameters for the selected super-resolution technique.

In at least one embodiment, the one or more calculated video metrics includes at least one temporal-motion metric. In at least one such embodiment, the at least one calculated temporal-motion metric includes an x-direction temporal-motion metric and a y-direction temporal-motion metric.

In at least one embodiment, the process further includes selecting a super-resolution regularization configuration parameter based at least in part on the at least one calculated temporal-motion metric.

In at least one embodiment, the one or more calculated video metrics includes an illumination-changes metric. In at least one such embodiment, the process further includes using the calculated illumination-changes metric to conduct DC removal with respect to the input set of video frames.

In at least one embodiment, the one or more calculated video metrics includes a blockiness metric. In at least one such embodiment, the calculated blockiness metric involves a one-dimensional discrete cosine transform. In at least one other such embodiment, the process further includes selecting a super-resolution deblurring-strength configuration parameter based at least in part on the at least one calculated blockiness metric.

In at least one embodiment, the one or more calculated video metrics includes a face-softness metric.

In at least one embodiment, calculating the weighted sum based on the obtained metric-specific weighting factors and the corresponding calculated video metrics includes calculating respective products of the obtained metric-specific weighting factors and the corresponding calculated video metrics, and further includes calculating the weighted sum as the sum of the calculated products.

In at least one embodiment, the process further includes initializing one or more of the metric-specific weighting factors to a respective default value.

In at least one embodiment, the selected super-resolution technique includes a single-frame reconstruction super-resolution technique. In at least one such embodiment, the single-frame reconstruction super-resolution technique includes single-frame bicubic interpolation. In at least one other such embodiment, the single-frame reconstruction super-resolution technique includes single-frame Lanczos interpolation. In at least one other such embodiment, the single-frame reconstruction super-resolution technique includes single-frame fast video upsampling.

In at least one embodiment, the selected super-resolution technique includes a multiframe reconstruction super-resolution technique.

In at least one embodiment, the selected super-resolution technique includes a spatial-sharpening technique. In at least one other embodiment, the selected super-resolution technique includes a temporal smooth-filtering technique.

In at least one embodiment, selecting a super-resolution technique based at least in part on the calculated weighted sum includes referencing correlation data that maps ranges of weighted sums to corresponding super-resolution techniques. In at least one such embodiment, the process further includes generating a super-resolved input set of video frames at least in part by applying the selected super-resolution technique to the input set of video frames; obtaining operational-results data at least in part by performing face recognition on the super-resolved input set of video frames; and calibrating the correlation data based at least in part on one or more of the calculated video metrics and at least in part on the obtained operational-result data. In at least one such embodiment, the obtained operational-result data includes one or more face-recognition-system confidence scores. In at least one other such embodiment, the obtained operational-result data includes received user-feedback data. In at least one other such embodiment, calibrating the correlation data includes calibrating one or more of the metric-specific weighting factors. In at least one other such embodiment, the ranges of weighted averages are defined by respective range boundaries, and calibrating the correlation data includes calibrating one or more of the range boundaries. In at least one other such embodiment, the process further includes initializing one or more of the range boundaries to a respective default value.

In at least one embodiment, the process described in the immediately preceding paragraph further includes obtaining training-metric data at least in part by calculating one or more of the video metrics with respect to one or more training sets of video frames; obtaining training-technique-result data at least in part by applying one or more of the super-resolution techniques in the plurality of super-resolution techniques to one or more of the training sets of video frames; and calibrating the correlation data based at least in part on the obtained training-metric data and at least in part on the obtained training-technique-result data. In at least one such embodiment, calibrating the correlation data includes calibrating one or more of the metric-specific weighting factors. In at least one other such embodiment, the ranges of weighted sums are defined by respective range boundaries, and calibrating the correlation data includes calibrating one or more of the range boundaries. In at least one other such embodiment, the obtained training-technique-result data includes one or more face-recognition-system confidence scores. In at least one other such embodiment, the obtained training-technique-result data includes received user-feedback data; in at least one such embodiment, calibrating the correlation data includes dropping correlation data pertaining to one or more of the training sets of video frames based at least in part on the received user-feedback data; in at least one other such embodiment, the received user-feedback data includes data that rates a given super-resolution technique as being associated with better face-recognition results than another super-resolution technique.

In at least one embodiment, the process further includes generating a super-resolved input set of video frames at least in part by applying the selected super-resolution technique to the input set of video frames. In at least one such embodiment, the process further includes performing face recognition on the super-resolved input set of video frames. In at least one other such embodiment, the process further includes obtaining a first face-recognition identification and a first face-recognition confidence score for the super-resolved input set of video frames; obtaining a second face-recognition identification and a second face-recognition confidence score for the input set of video frames; outputting an indication of the first face-recognition identification when the first face-recognition confidence score exceeds the second face-recognition confidence score; and outputting an indication of the second face-recognition identification when the second face-recognition confidence score exceeds the first face-recognition confidence score. Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . . " And it is for reasons akin to brevity and clarity of presentation that this implied leading clause is not repeated ad nauseum in this detailed description.

Figure 1:
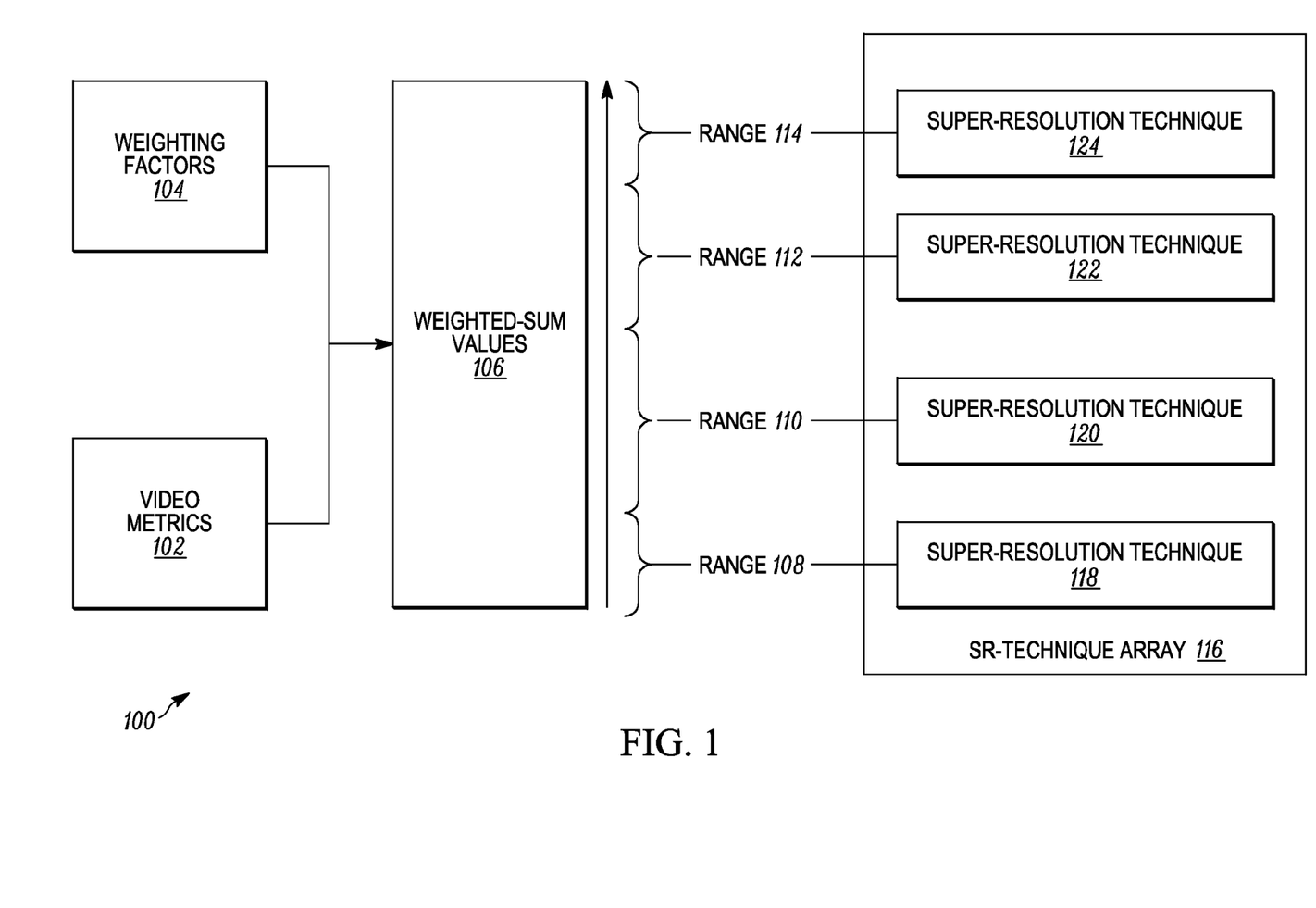
FIG. 1 depicts an example conceptual overview of the presently disclosed methods and systems, in accordance with an embodiment.

FIG. 1 depicts an example conceptual overview of the presently disclosed methods and systems, in accordance with an embodiment. As depicted in FIG. 1, video metrics 102 and weighting factors 104 are used in conjunction to generate weighted sums. In at least one embodiment, there is a specific weighting factor associated with each video metric (e.g., if there are seven video metrics, there are seven weighting factors). Video metrics 102 may be an array containing each video metric and, likewise, weighting factors 104 may be an array containing each associated weighting factor. In an embodiment, each video metric is multiplied by its respective associated weighting factor, and these products are collectively summed to generate the weighted sum.

The value of the weighted sum will fall within the range of weighted-sum values 106. In an embodiment, each range 108-114 represents a unique and mutually exclusive set of possible values of weighted sums, and each range 108-114 is associated with a respective one of the depicted super-resolution techniques 118-124, which are depicted in the example of FIG. 1 as being included in a super-resolution-technique array 116. Of course, a number other than four ranges and respectively associated super-resolution techniques could be used in various different embodiments, as four is used purely by way of example and not limitation in FIG. 1.

FIG. 1 highlights the relationship that exists in the depicted embodiment between weighted-sum values 106 and the SR-technique array 116. In at least one embodiment, a specific weighted sum will fall within a range 108-114, and each range 108-114 is associated with a specific super-resolution technique. For example, if the weighted sum is a value included in the range 110, then that weighted sum is associated with super-resolution technique 120. In at least one embodiment, each super-resolution technique is mapped to only one weighted-sum range. In at least one other embodiment each super-resolution technique is mapped to one or more weighted-sum ranges.

FIG. 1 can be thought of as a primer. It is included for at least the reason that it briefly introduces concepts that are discussed hereafter in greater detail; indeed, the conceptual overview 100 that is depicted in FIG. 1 is included to aid the reader in ascertaining an introductory understanding of the nature of this disclosure. It is provided by way of example and not limitation, as an introductory guide for the reader.

Figure 2:
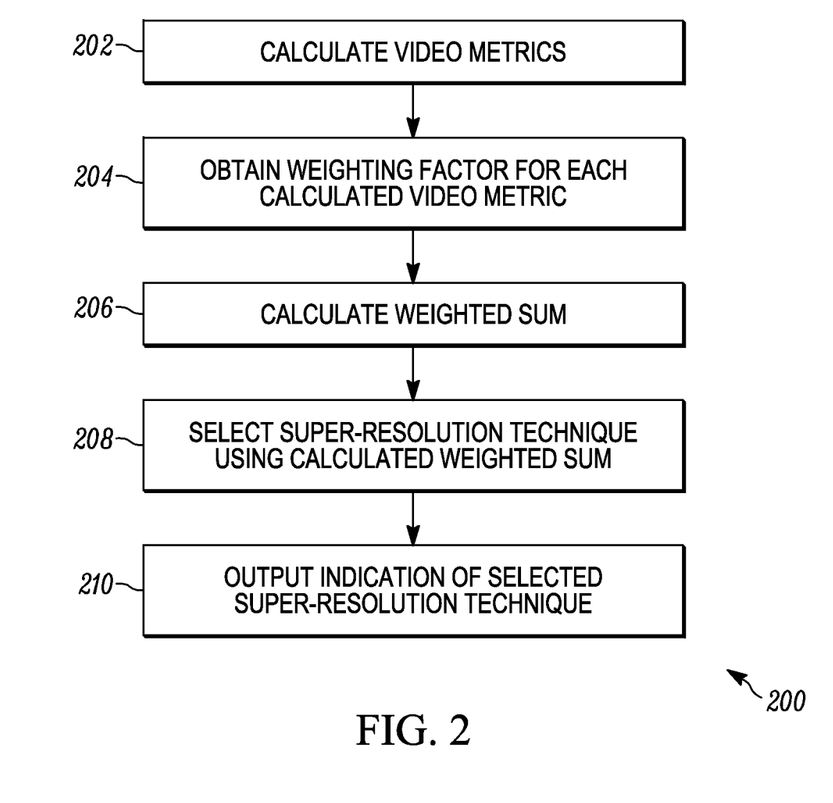
FIG. 2 depicts an example process, in accordance with an embodiment.

FIG. 2 depicts an example process, in accordance with an embodiment. The example process 200 describes functionality similar to that described above in general in connection with the conceptual overview 100 of FIG. 1. The example process 200 is described below as being carried out by an example system, which may include a communication interface, a processor, and data storage containing instructions executable by the processor for causing the system to carry out the described functions.

At step 202, the system calculates one or more video metrics 102 with respect to an input set of video frames, which is described in more detail in the following figure descriptions. In at least one embodiment, and as further described below, the video metrics 102 are derived from the input set of video frames using a video-metrics calculator.

At step 204, the system obtains respective metric-specific weighting factors 104 for each of the calculated video metrics 102. In at least one embodiment, the weighting factors 104 are fixed values (e.g., in an operation mode). In at least one other embodiment, the weighting factors 104 are trainable values that are adjusted according to one or more inputs (e.g., using user feedback and/or facial-recognition confidence scores, perhaps in a training mode).

At step 206, the system calculates a weighted sum based on the obtained metric-specific weighting factors 104 and the corresponding calculated video metrics 102. In at least one embodiment, this step involves using a weighted-sum calculator to generate the weighted sum by (i) calculating respective products of the obtained metric-specific weighting factors and the corresponding calculated video metrics and (ii) calculating the weighted sum as the sum of the calculated products.

At step 208, the system selects, based at least in part on the calculated weighted sum, a super-resolution technique from an SR-technique array 116. As mentioned above, a set of ranges of weighted-sum values can be used to select a super-resolution technique based on a particular weighted-sum value. In at least one embodiment, the process further includes selecting, based at least in part on one or more of the calculated video metrics 102, one or more configuration parameters for the selected super-resolution technique.

At step 210, the system outputs an indication of the selected super-resolution technique. In at least one embodiment, the selected super-resolution technique is employed to generate super-resolved frames from the input set of video frames.

In at least one embodiment, the process further includes initializing one or more of the metric-specific weighting factors 104 to respective default values. In at least one other embodiment, the process further includes initializing one or more boundaries of one or more of the ranges 108-114 to respective default values.

In the following figure descriptions, more detail is provided with respect to various system modules and their respective associated functionality. The concepts introduced in FIG. 1 will be described and elaborated on within the context of a system that performs at least the process 200 of FIG. 2.

In the present disclosure, various elements of one or more of the described embodiments are referred to as modules that carry out (i.e., perform, execute, and the like) various functions described herein. As the term "module" is used herein, each described module includes hardware (e.g., one or more processors, microprocessors, microcontrollers, microchips, application-specific integrated circuits (ASICs), field programmable gate arrays (FPGAs), memory devices, and/or one or more of any other type or types of devices and/or components deemed suitable by those of skill in the relevant art in a given context and/or for a given implementation. Each described module also includes instructions executable for carrying out the one or more functions described as being carried out by the particular module, where those instructions could take the form of or at least include hardware (i.e., hardwired) instructions, firmware instructions, software instructions, and/or the like, stored in any non-transitory computer-readable medium deemed suitable by those of skill in the relevant art.

Figure 3:
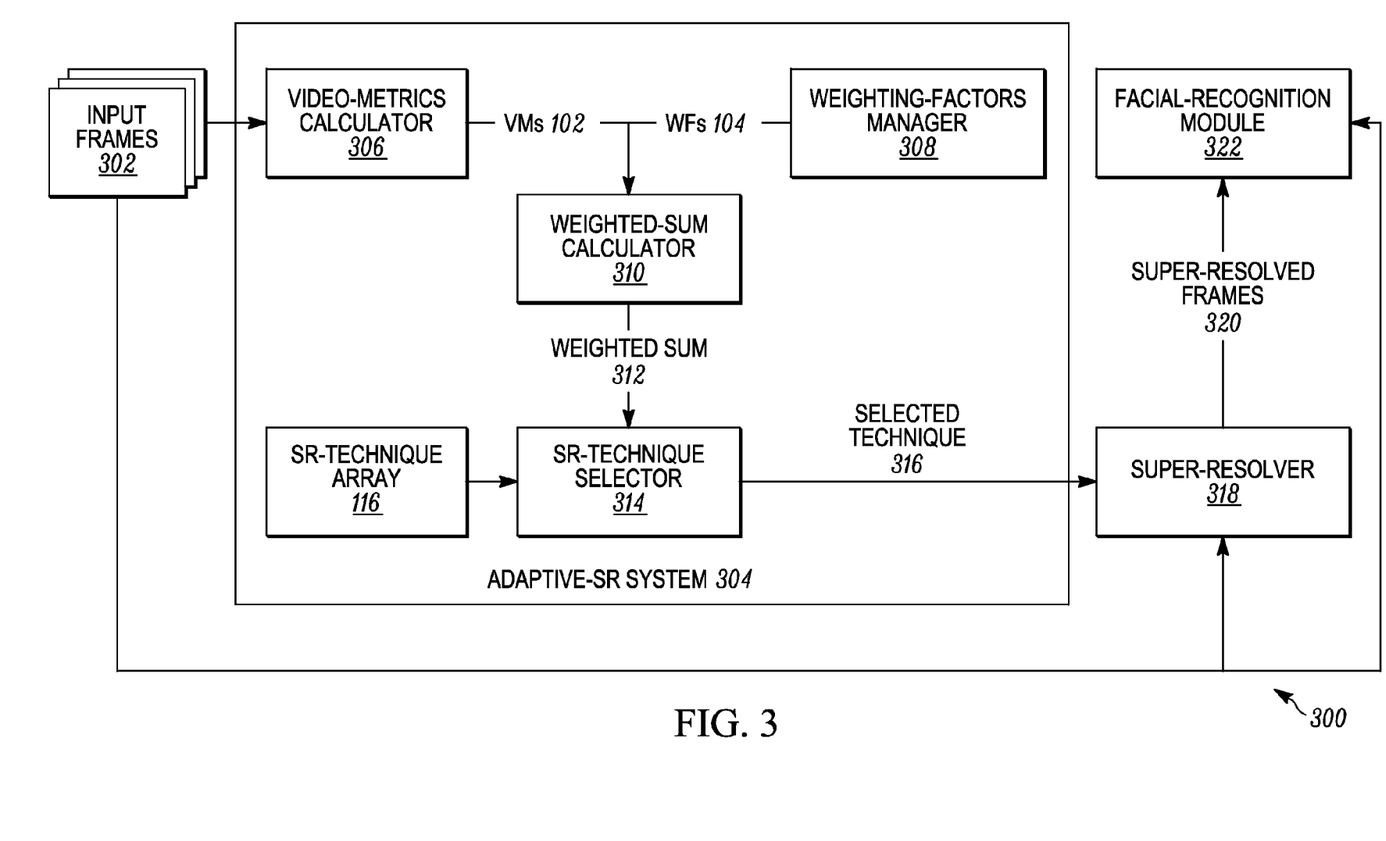
FIG. 3 depicts an example system in an operational mode, in accordance with an embodiment.

FIG. 3 depicts an example system in an operational mode, in accordance with an embodiment. The example system 300 shows a system that can perform at least the process 200 of FIG. 2.

Input frames 302 are input to a module referred to herein as a video-metrics calculator 306. The video-metrics calculator 306 calculates one or more video metrics 102 with respect to the input frames 302. Calculating various video metrics with respect to a set of input frames is well known by those with skill in the relevant art. In at least one embodiment, the one or more calculated video metrics includes at least one temporal-motion metric. In at least one such embodiment, the process further includes selecting a super-resolution regularization configuration parameter based at least in part on the at least one calculated temporal-motion metric. In at least one other such embodiment, the at least one calculated temporal-motion metric includes an x-direction temporal-motion metric and a y-direction temporal-motion metric. The x and y temporal-motion metric may comprise a 2D vector field where each vector is a displacement vector showing the movement of points from a first frame to a second frame. In at least one such embodiment, for 2k+1 input frames centered about a reference frame that is denoted the x-direction temporal-motion metric (MX) is calculated as:

$$MX = \sum_{n=-k}^{k} [mx(f_{i+n})]/(2k+1) \quad \text{(Eq. 1)}$$

and the y-direction temporal-motion metric (MY) is calculated as:

$$MY = \sum_{n=-k}^{k} [my(f_{i+n})]/(2k+1) \quad \text{(Eq. 2)}$$

where mx, the normalized sum of absolute motion vector in the horizontal direction over a single frame, is calculated as:

$$mx(f_{i+n}) = \sum_{x=1}^{w*h} |mxp_x|/(w*h) \quad \text{(Eq. 3)}$$

and where my, the normalized sum of absolute motion vector in the vertical direction over a single frame, is calculated as:

$$my(f_{i+n}) = \sum_{x=1}^{w*h} |myp_x|/(w*h) \quad \text{(Eq. 4)}$$

where mxp and myp are the local (pixel-level) motion metrics for the horizontal and vertical, respectively, x is the pixel index of the image, w is the width of the frame, and h is the height of the frame. Motion metrics mxp and myp may comprise for example, pixel level motion flows, or so-called optical flows. The optical flow estimation receives a pair of consecutive images (namely current image at time t+1, and a previous image at t). The previous image at t can be used as a reference image for optical flow estimation.

To estimate the optical flow of a pixel of $(x,y)_{t+1}$ from the current image t+1, the optical flow module selects a window centered at pixel $(x, y)_{t+1}$ to be estimated, where $(x,y)_{t+1}$ is the horizontal and vertical coordinates of the current image t+1. For example, a window size of 3×3 pixels may be used. Based on the co-located pixel location $(x,y)_t$ of the reference image t, this module selects a search window for optical flow estimation. The search window can be any size, and it is used to define the search range. Then, the optical flow module scans around the pixel $(x,y)_t$ with the specified window size (i.e. 3×3) to find out the optical flow displacement (referred to herein above as mxp and myp), relating to the pixel $(x,y)_{t+1}$.

In at least one embodiment, the one or more calculated video metrics includes an illumination-changes metric. In at least one such embodiment, for 2k+1 input frames, the illumination-changes metric ($\Delta Y$) is calculated as:

$$\Delta Y = \sum_{n=-k}^{k} [AvgY(f_{i+n}) - AvgY(f_i)]/(2k+1) \quad \text{(Eq. 5)}$$

where AvgY is the average luminance over a single frame, defined as:

$$AvgY(f_{i+n}) = \sum_{x=1}^{w*h} [Y_x]/(w*h) \quad \text{(Eq. 6)}$$

where Y is the luminance pixel information of the frame, x is the pixel index of the image, w is the width of the frame, and h is the height of the frame.

In at least one such embodiment, the process further includes using the calculated illumination-changes metric to conduct DC removal with respect to the input set of video frames.

Figure 7:
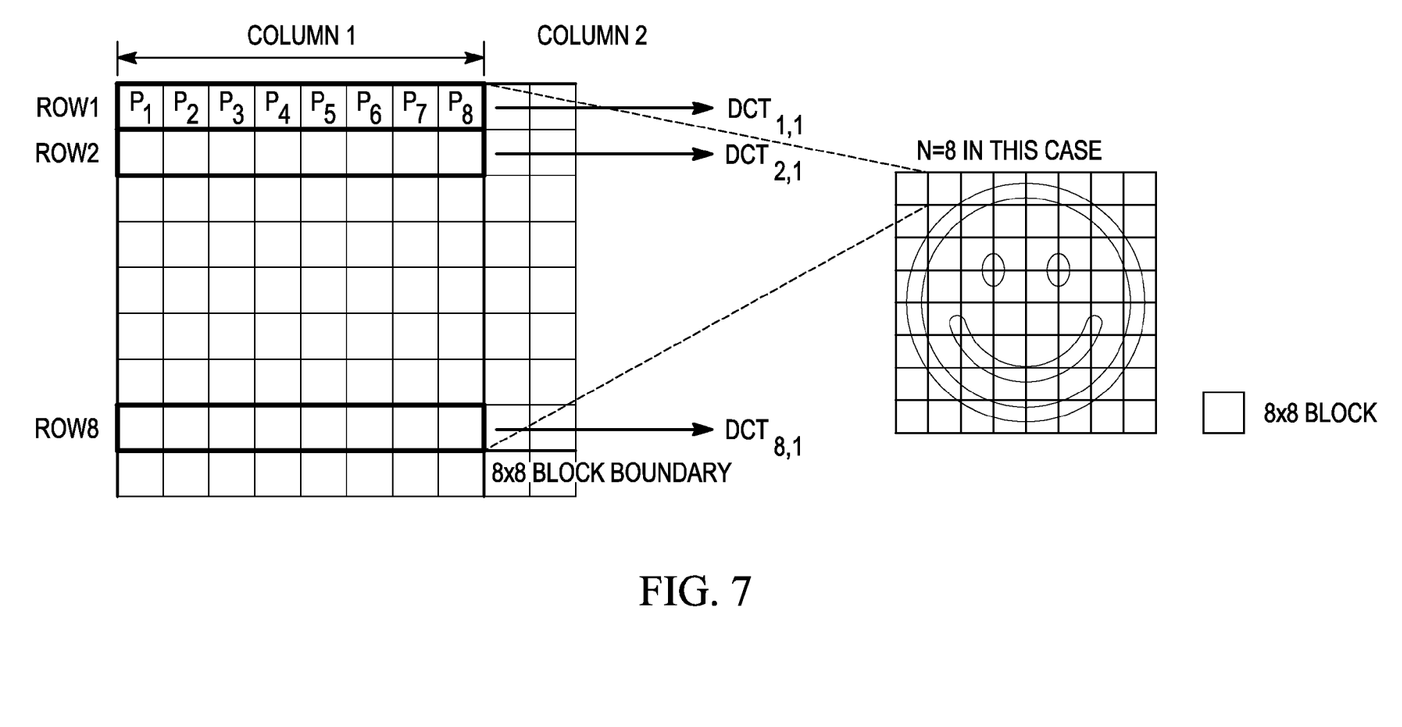
FIG. 7 depicts an embodiment of determining a blockiness metric.

In at least one embodiment as shown in FIG. 7, the one or more calculated video metrics includes a blockiness metric (BM). In at least one such embodiment, the calculated blockiness metric involves calculating the average one-dimensional (1D) discrete cosine transform (DCT) over the entire reference frame ($f_i$) only. The reference frame (or the cropped face image) is macroblock-aligned (e.g. 16×16 or 8×8) to the original video frame.

The blockiness metric is calculated as:

$$BM(f_i) = \sum_{r=1}^{X} \sum_{c=1}^{Y} DCT_{r,c}(u)/(X*Y) \quad \text{(Eq. 7)}$$

and where X is the total number of rows of the frame, Y is the total number of columns of the frame, where Y=W/N and W is the picture width of the frame. A column is defined as a group of 1×N horizontal pixels. r is the row index of the frame, and r=1, 2, . . . , X. c is the column index, and c=1, 2, . . . , Y.

The one-dimensional (1D) discrete cosine transform (DCT) of the particular row and column of the frame is calculated as:

$$DCT_{r,c}(u) = \sqrt{\frac{2}{N}} \sum_{i=1}^{N} C(u) \cos\left[\frac{u\pi}{2N}(2i+1)\right] p_{r,c}(i) \quad \text{(Eq. 8)}$$

where:

$$C(u) = \begin{cases} \dfrac{1}{\sqrt{2}}, & \text{for } u = 0, \\ 1, & \text{elsewhere} \end{cases} \quad \text{(Eq. 9)}$$

and where N is the total number of horizontal pixels in a column. $p_{r,c}(i)$ is the luminance of the i-th pixel of the r-th row and c-th column of the frame, and u=1, 2, . . . , N.

In principle, each DCT coefficient with the exception of u=0 can provide a QP (quantization parameter) estimate, and thus is suitable for blockiness measurements in some embodiments. N=8 is recommended to be used in some embodiments because the 8×8 DCT transform is commonly used on the compressed video frame, and 8 pixels DCT transform has to be horizontally block-aligned to the original 8×8 DCT block.

In yet a further embodiment, the blockiness metric may be calculated from the average QP (quantization parameter) based on reference frame ($f_r$) only. The reference frame (or the cropped face image) may be macroblock-aligned (e.g. 16×16 or 8×8) to the original video frame. The QP value of each macroblock is extracted out from the original encoded bitstream for the average QP calculation. The average QP value is then used as blockiness metric.

$$BM(f_i) = \sum_{mb=1}^{x} QP[mb] \quad \text{(Eq. 10)}$$

where mb is the macroblock index of the reference frame, x is the last macroblock index (in raster scan order) of the reference frame, QP is the quantization parameter (0 to 51 in range).

In at least one other such embodiment, the process further includes selecting a super-resolution deblurring-strength configuration parameter based at least in part on the at least one calculated blockiness metric.

In at least one embodiment, the one or more calculated video metrics includes a face-softness metric.

In at least one embodiment, a module referred to herein as a weighting-factors manager 308 stores the weighting factors 104 associated with each of the video metrics 102.

The video metrics 102, output from the video-metrics calculator 306, and the weighting factors 104, output from the weighting-factors manager 308, are input to a module referred to herein as a weighted-sum calculator 310. In at least one embodiment, an output of the weighted-sum calculator 310, a weighted sum 312 (WS), is calculated as:

$$WS = \sum_{i=1}^{N} VM_i * WF_i \quad \text{(Eq. 11)}$$

where N is the number of video metrics.

The weighted sum 312 (output from the weighted-sum calculator 310) and the SR-technique array 116 are input to a module referred to herein as an SR-technique selector 314, which selects, based at least in part on the weighted sum 312, a super-resolution technique from the SR-technique array 116. In at least one embodiment, selecting a super-resolution technique based at least in part on the calculated weighted sum includes referencing correlation data that maps ranges of weighted sums (e.g., the ranges 108-114 of FIG. 1) to corresponding super-resolution techniques.

In an embodiment, the video-metrics calculator 306, weighting-factors manager 308, weighted-sum calculator 310, SR-technique selector 314, and SR-technique array 116 are all part of an adaptive super-resolution system 304. In an embodiment, the adaptive-SR 304 system can operate in two modes. In at least one embodiment, the adaptive-SR system 304 operates in an operation mode. In at least one other embodiment, the adaptive-SR system 304 operates in a training (i.e., learning) mode. In an embodiment, in the operation mode, the content of the weighting-factors manager 308 does not change; i.e., the weighting factors 104 are static; in other embodiments, the weighting factors are modifiable even in operation mode. In an embodiment, in the learning mode, the content of the weighting-factors manager 308 is modifiable; i.e., in at least one embodiment, the weighting factors 102 are adjustable by the weighting-factors manager 308.

In an embodiment, the output of the SR-technique selector 314 is a selected technique 316. In at least one embodiment, the selected technique 316 includes a single-frame reconstruction super-resolution technique. In at least one such embodiment, the single-frame reconstruction super-resolution technique includes single-frame bicubic interpolation. In at least one other such embodiment, the single-frame reconstruction super-resolution technique includes single-frame Lanczos interpolation. In at least one other such embodiment, the single-frame reconstruction super-resolution technique includes single-frame fast video upsampling. In at least one other embodiment, the selected technique 316 includes a multiframe reconstruction super-resolution technique. In at least one embodiment, the selected technique 316 includes a spatial-sharpening technique. In at least one other embodiment, the selected technique 316 includes a temporal smooth-filtering technique.

In an embodiment, the selected technique 316 and the input frames 302 are input to module referred to herein as a super-resolver 318. The super-resolver 318 performs the selected technique 316 on the input frames 302 to generate super-resolved frames 320. In an embodiment, the super-resolved frames 320 (output from the super-resolver 318) and the input frames 302 are input to a module that is referred to herein as a facial-recognition module 322, which performs facial recognition in a manner known to those with skill in the relevant art.

Figure 4:
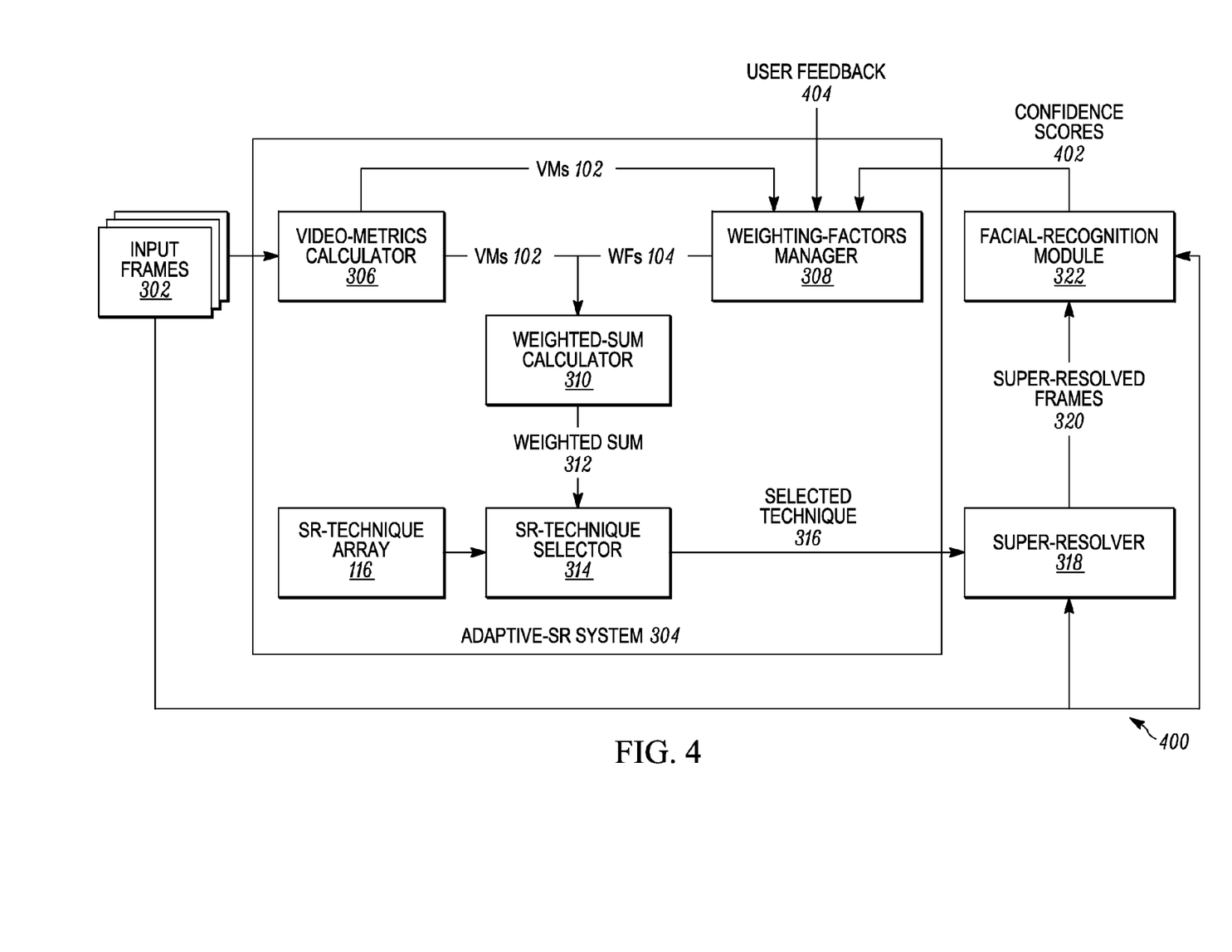
FIG. 4 depicts the example system of FIG. 3 in a training mode, in accordance with an embodiment.

FIG. 4 depicts the example system of FIG. 3 in a training mode, in accordance with an embodiment. In the embodiment that is depicted in FIG. 4, it is contemplated that the super resolver 318 will run each set of input frames through each of a plurality of super-resolution techniques, and that the super-resolved frames 320 from each technique will be run through facial-recognition module 322 in order to generate facial-recognition confidence scores 402 and/or user feedback 404 regarding how accurate the facial-recognition processes turned out to be when based on the various different available super-resolution techniques, in order to shape the various video-metric weighting factors through a process of discovering what video-metric values tend to correlate with various different super-resolution techniques being better than others, in the eyes of the facial-recognition-system confidence scores 402 and/or user feedback 404.

In an embodiment, the confidence scores 402 are output from the facial-recognition module 322. The video metrics 102, confidence scores 402, and user feedback 404 are input to the weighting-factors manager 308. The confidence scores 402 are generated by the facial-recognition module 322 and represent a certainty level associated with a facial-recognition result (i.e., how probable the facial-recognition software considers it to be that it matched a face to a specific individual and/or how probable the software considers it to be that it rejected a false matching). In at least one embodiment, confidence scores 402 are output by the facial-recognition module 322 for results associated with the use of the super-resolved frames 320 as input to the facial-recognition module 322. In at least one embodiment, confidence scores 402 are output by the facial-recognition module 322 for results associated with the use of the input frames 302 as input to the facial-recognition module 322.

In at least one embodiment, the process described herein further includes (i) obtaining training-metric data at least in part by calculating one or more of the video metrics 102 with respect to one or more training sets of video frames, (ii) obtaining training-technique-result data at least in part by applying one or more of the super-resolution techniques in the SR-technique array 116 to one or more of the training sets of video frames, and (iii) calibrating correlation data based at least in part on the obtained training-metric data and at least in part on the obtained training-technique-result data. In at least one such embodiment, calibrating the correlation data includes calibrating one or more of the metric-specific weighting factors 104. In at least one other such embodiment, the ranges of weighted sums are defined by respective range boundaries, and calibrating the correlation data includes calibrating one or more of the range boundaries. In at least one other such embodiment, the obtained training-technique-result data includes one or more face-recognition-system confidence scores 402. In at least one other embodiment, the obtained training-technique-result data includes received user-feedback 404. In at least one embodiment, calibrating the correlation data includes dropping correlation data pertaining to one or more of the training sets of video frames based at least in part on the user feedback 404. In at least one other embodiment, the user feedback 404 includes data that rates a given super-resolution technique as being associated with better face-recognition results than another super-resolution technique.

In at least one embodiment, the system 400 iteratively selects each super-resolution technique from the SR-technique array 116. Confidence scores are provided by the facial-recognition module 322 for each set of super-resolved input frames 320 and for the input frames 302. A user has access to confidence scores 402 associated with every possible set of super-resolved frames 320 generated by use of each technique in the SR-technique array 116 as well as confidence scores 402 associated with facial-recognition being performed on the input frames 302. The user feedback 404 is generated by said user. The user can look at the results of the facial-recognition module 322 as well as the confidence scores 402 and determine which result is preferred. The user may or may not take into consideration the confidence scores 402 when providing the user feedback 404 to the weighting-factors manager 308.

In at least one such embodiment, the weighting-factors manager 308 adjusts the weighting factors 104. In some embodiments the adaptive-SR system 304 adjusts the ranges of weighted sum values corresponding to individual SR-techniques. As a result, the adaptive-SR system 304 determines which SR-technique should be employed given a certain set of video metrics by referencing a weighted sum, determining which range that weighted sum is included in, and performing the SR-technique associated with that range. In at least one embodiment, a cluster analysis is performed by the adaptive-SR system 304 to achieve this. In at least one other embodiment, a vector-optimization is performed by the adaptive-SR system 304 to achieve this. The specific mathematical method used by the adaptive-SR system 304 could be a combination of many different techniques. And certainly the types of techniques discussed above are not provided to limit the scope of the herein described systems and processes, but are merely mentioned as suitable examples.

In at least one embodiment, the process described herein includes the facial-recognition module 322 performing face recognition on the super-resolved input set of video frames. In at least one such embodiment, the process further includes (i) obtaining a first face-recognition identification and a first face-recognition confidence score for the super-resolved input set of video frames, (ii) obtaining a second face-recognition identification and a second face-recognition confidence score for the input set of video frames, (iii) outputting an indication of the first face-recognition identification when the first face-recognition confidence score exceeds the second face-recognition confidence score, and (iv) outputting an indication of the second face-recognition identification when the second face-recognition confidence score exceeds the first face-recognition confidence score. And certainly other implementations are possible.

In at least one embodiment, determining the selected technique 316 includes referencing correlation data that maps ranges of weighted sums to corresponding super-resolution techniques included in the SR-technique array 116. In at least one such embodiment, the process includes (i) generating a super-resolved input set of video frames at least in part by applying the selected super-resolution technique to the input set of video frames, (ii) obtaining operational-results data at least in part by performing face recognition on the super-resolved input set of video frames, and (iii) calibrating the correlation data based at least in part on one or more of the calculated video metrics and at least in part on the obtained operational-result data. In at least one such embodiment, the obtained operational-result data includes one or more face-recognition-system confidence scores 402. In at least one other such embodiment, the obtained operational-result data includes received user-feedback data 404. In at least one other such embodiment, calibrating the correlation data includes calibrating one or more of the metric-specific weighting factors. In at least one other such embodiment, the ranges of weighted averages are defined by respective range boundaries, and calibrating the correlation data includes calibrating one or more of the range boundaries.

Figure 5:
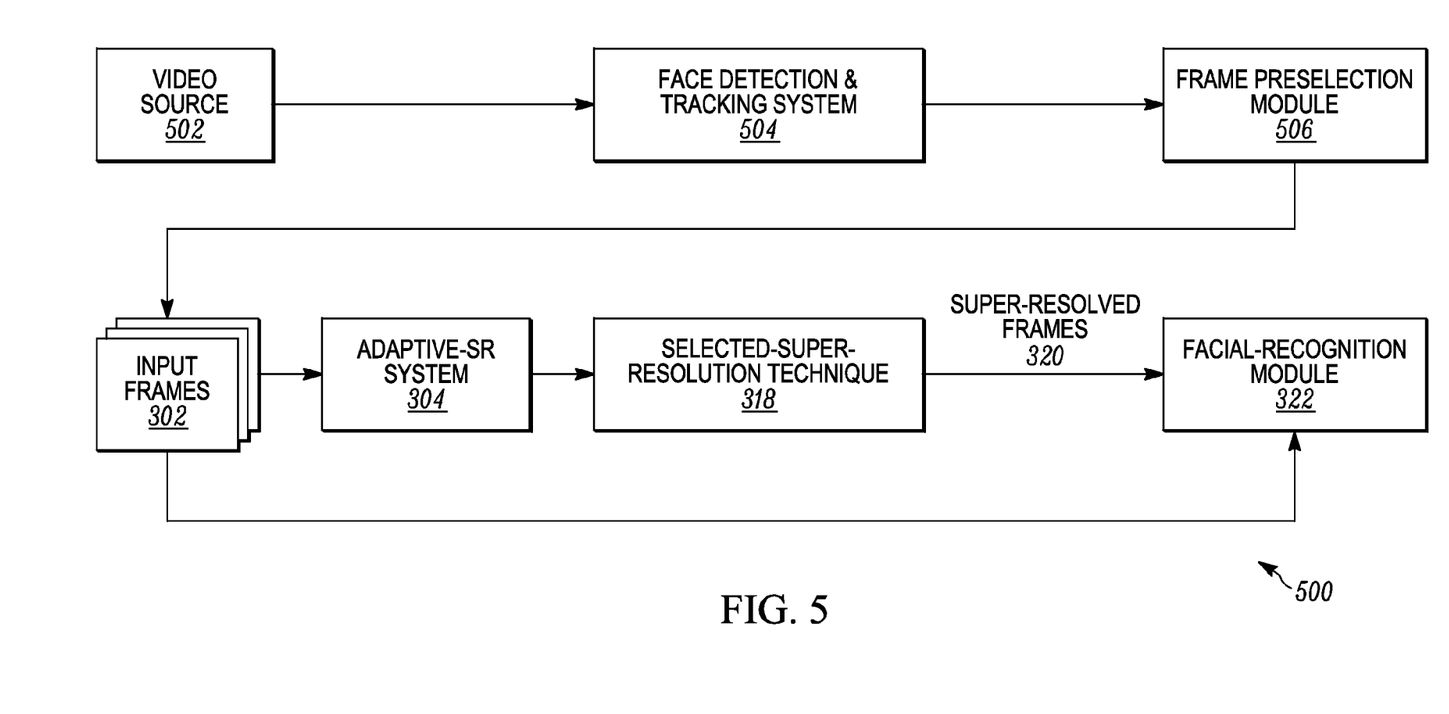
FIG. 5 depicts the example system of FIG. 3 as well as an example input-frame-pre-selection system, in accordance with an embodiment.

FIG. 5 depicts the example system of FIG. 3 as well as an example input-frame-pre-selection system, in accordance with an embodiment. The system 500 depicts three modules preceding the input frames 302. A video source 502 is input to a face detection & tracking system 504 whose output is input to a frame pre-selection module 506. The face detection & tracking system 504 performs one or both of face detection and tracking, which are procedures that are known by those with skill in the relevant art. In at least one embodiment, the process described herein further includes pre-selecting the set input frames 302 from a larger set of video frames that are output from the video source 502. In at least one embodiment, the purpose of the frame pre-selection module 506 is to filter out vastly abnormal frames, and frames not suitable for facial recognition, before sending this data to be used as the input frames 302. In at least one such embodiment, the input set of video frames is a set of a first number of video frames, wherein pre-selecting the input set of video frames from the larger set of video frames includes (i) calculating, for each video frame in the larger set of video frames, a pixelwise sum of absolute difference (SAD) of luminance values with respect to a reference frame in the larger set of video frames and (ii) selecting, for inclusion in the input set of video frames, the first number of video frames from the larger set of video frames having the lowest respective pixelwise SADs of luminance values with respect to the reference frame. In an embodiment the SAD between a targeted frame $F_{i+n}$ relating to the $i^{th}$ frame is calculated as:

$$SAD(F_{i+n}) = \sum_{x=1}^{w*h} |Y_x(F_{i+n}) - Y_x(F_i)| \qquad \text{(Eq. 12)}$$

where Y is the luminance pixel information of the frame, x is the pixel index of the image, w is the width of the frame, and h is the height of the frame.

In at least one SAD embodiment, the process further includes (i) obtaining an interpupillary distance (IPD) of a face in one or more video frames in the larger set of video frames and (ii) selecting a particular frame in the larger set of video frames to be the reference frame based at least in part on the obtained IPD for the particular frame. In at least one such embodiment, the process further includes (i) obtaining spatial-orientation data for the face in one or more video frames in the larger set of video frames and (ii) selecting the particular frame to be the reference frame based at least in part the obtained spatial-orientation data.

Figure 6:
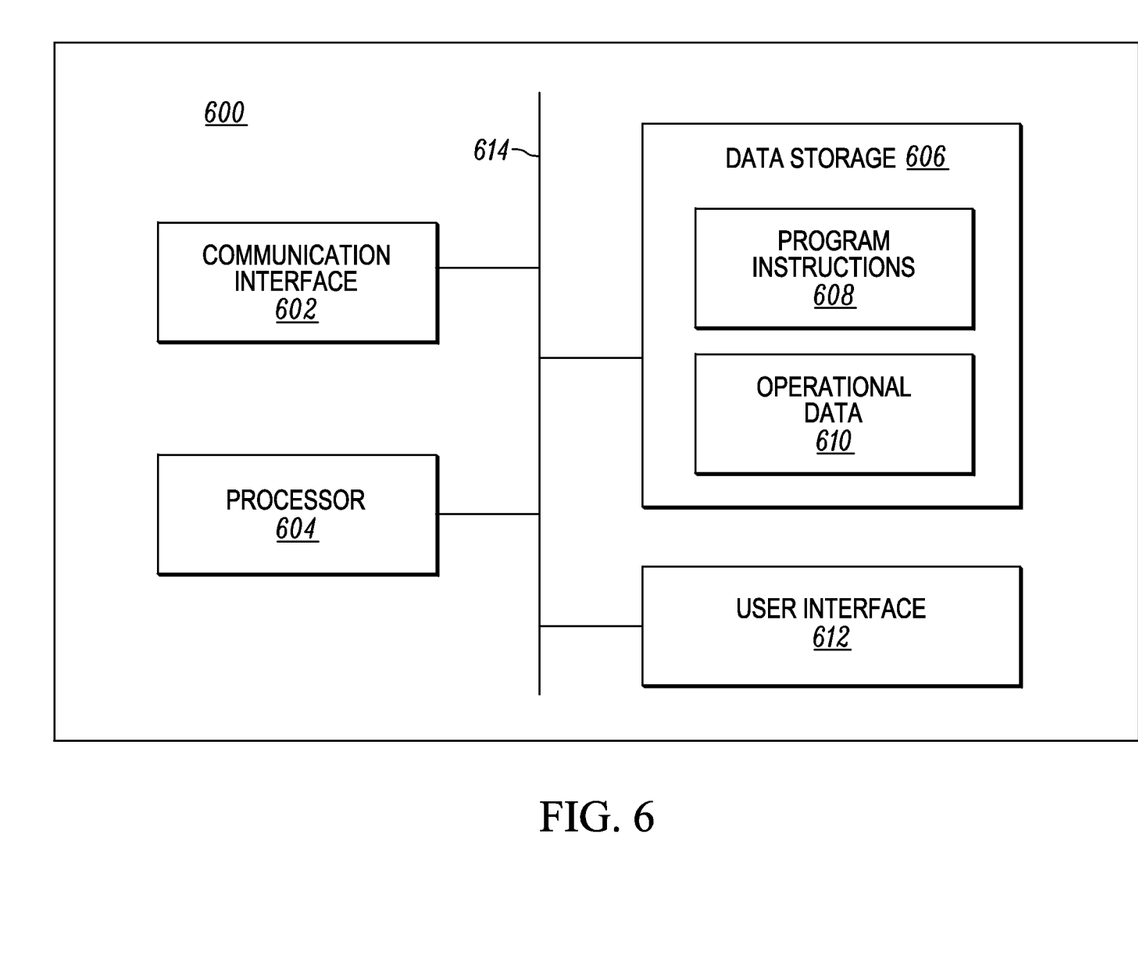
FIG. 6 depicts an example computing and communication device, in accordance with an embodiment.

FIG. 6 depicts an example computing and communication device (CCD), in accordance with an embodiment. The example CCD 600 is depicted as including a communication interface 602, a processor 604, a data storage 606, and a user interface 612, all of which are communicatively coupled with one another via a system bus (or other suitable connection, network, or the like) 614. As a general matter, the example CCD 600 is presented as an example system that could be programmed and configured to carry out the functions described herein.

The communication interface 602 may include one or more wireless-communication interfaces (for communicating according to, e.g., LTE, Wi-Fi, Bluetooth, and/or one or more other wireless-communication protocols) and/or one or more wired-communication interfaces (for communicating according to, e.g., Ethernet, USB, and/or one or more other wired-communication protocols). As such, the communication interface 602 may include any necessary hardware (e.g., chipsets, antennas, Ethernet cards, etc.), any necessary firmware, and any necessary software for conducting one or more forms of communication with one or more other entities as described herein. The processor 604 may include one or more processors of any type deemed suitable by those of skill in the relevant art, some examples including a general-purpose microprocessor and a dedicated digital signal processor (DSP).

The data storage 606 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 6, the data storage 606 contains program instructions 608 executable by the processor 604 for carrying out various functions and operational data 610. In an embodiment in which a computing system such as the example CCD 600 is arranged, programmed, and configured to carry out methods such as the method 200 described herein, the program instructions 608 are executable by the processor 604 for carrying out those functions; in instances where other entities described herein have a structure similar to that of the example CCD 600, the respective program instructions 608 for those respective devices are executable by their respective processors 604 to carry out functions respectively performed by those devices.

The user interface 612 may include one or more input devices (a.k.a. components and the like) and/or one or more output devices. With respect to input devices, the user interface 612 may include one or more touchscreens, buttons, switches, microphones, and the like. With respect to output devices, the user interface 612 may include one or more displays, speakers, light emitting diodes (LEDs), and the like. Moreover, one or more components (e.g., an interactive touchscreen-and-display component) of the user interface 612 could provide both user-input and user-output functionality. And certainly other user-interface components could be implemented in a given context, as known to those of skill in the art.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 1%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for selecting a super-resolution technique for improved face recognition performance, the method including:
    calculating one or more video metrics with respect to an input set of video frames;
    obtaining a metric-specific weighting factor for each of the calculated video metrics;
    calculating a weighted sum based on the obtained metric-specific weighting factors and the corresponding calculated video metrics;
    selecting, based on the calculated weighted sum, a particular super-resolution technique from among a plurality of pre-determined super-resolution techniques by referencing correlation data that maps ranges of weighted sums to corresponding super-resolution techniques; and
    using the selected super-resolution technique to generate a super-resolved set of video frames by applying the selected super-resolution technique to the input set of video frames.

2. The method of claim 1, further comprising selecting one or more configuration parameters for the selected particular super-resolution technique based on one or more of the calculated video metrics.

3. The method of claim 1, wherein the one or more calculated video metrics includes a temporal-motion metric.

4. The method of claim 3, further comprising selecting a super-resolution regularization configuration parameter based on the temporal-motion metric.

5. The method of claim 1, wherein the one or more calculated video metrics includes an illumination-changes metric.

6. The method of claim 1, wherein the one or more calculated video metrics includes a blockiness metric.

7. The method of claim 1, wherein calculating the weighted sum based on the obtained metric-specific weighting factors and the corresponding calculated video metrics includes:
    calculating respective products of the obtained metric-specific weighting factors and the corresponding calculated video metrics; and
    calculating the weighted sum as the sum of the calculated products.

8. The method of claim 1, further including:
    obtaining training-metric data at least in part by calculating one or more of the video metrics with respect to one or more training sets of video frames;
    obtaining training-technique-result data at least in part by applying one or more of the super-resolution techniques in the plurality of super-resolution techniques to one or more of the training sets of video frames; and
    calibrating the correlation data based at least in part on the obtained training-metric data and at least in part on the obtained training-technique-result data.

9. The method of claim 8, wherein calibrating the correlation data includes calibrating one or more of the metric-specific weighting factors.

10. The method of claim 8, wherein the ranges of weighted sums are defined by respective range boundaries, and wherein calibrating the correlation data includes calibrating one or more of the range boundaries.

11. The method of claim 8, wherein the obtained training-technique-result data includes one or more face-recognition-system confidence scores.

12. The method of claim 8, wherein the obtained training-technique-result data includes received user-feedback data.

13. The method of claim 1, further including performing face recognition on the super-resolved set of video frames.

14. The method of claim 1, further including:
    obtaining a first face-recognition identification and a first face-recognition confidence score for the super-resolved set of video frames;
    obtaining a second face-recognition identification and a second face-recognition confidence score for the input set of video frames;
    outputting an indication of the first face-recognition identification when the first face-recognition confidence score exceeds the second face-recognition confidence score; and
    outputting an indication of the second face-recognition identification when the second face-recognition confidence score exceeds the first face-recognition confidence score.

15. The method of claim 1, the method further including:
    obtaining operational-results data at least in part by performing face recognition on the super-resolved input set of video frames; and
    calibrating the correlation data based on one or more of the calculated video metrics and at least in part on the obtained operational-results data.

16. The method of claim 15, wherein the obtained operational-results data includes one or more face-recognition-system confidence scores.

17. The method of claim 15, wherein the obtained operational-results data includes received user-feedback data.

18. A system for selecting a super-resolution technique for improved face recognition performance, the system including:
    a communication interface;
    a processor; and
    data storage containing instructions executable by the processor for causing the system to carry out a set of functions, the set of functions including:
        calculating one or more video metrics with respect to an input set of video frames;
        obtaining a metric-specific weighting factor for each of the calculated video metrics;
        calculating a weighted sum based on the obtained metric-specific weighting factors and the corresponding calculated video metrics;

selecting, based on the calculated weighted sum, a particular super-resolution technique from among a plurality of pre-determined super-resolution techniques by referencing correlation data that maps ranges of weighted sums to corresponding super-resolution techniques; and using the selected super-resolution technique to generate a super-resolved set of video frames by applying the selected super-resolution technique to the input set of video frames.

* * * * *